United States Patent [19]

Zanoni

[11] 4,159,522

[45] Jun. 26, 1979

[54] APPARATUS AND METHOD FOR MEASURING INTERFERENCE PATTERNS AND INTERFEROGRAMS

[76] Inventor: Carl A. Zanoni, 135 Azalea Dr., Middletown, Conn. 06457

[21] Appl. No.: 796,058

[22] Filed: May 12, 1977

[51] Int. Cl.² .................. G01B 11/00; G01B 9/02; G06F 15/36

[52] U.S. Cl. .................. 364/515; 356/345; 356/387; 358/107; 364/560

[58] Field of Search .................. 364/515, 560; 356/106 R, 160, 167; 358/107

[56] References Cited

U.S. PATENT DOCUMENTS

| | | | |
|---|---|---|---|
| 3,644,046 | 2/1972 | Ryan | 356/106 R |
| 3,917,926 | 11/1975 | Gerard et al. | 356/106 R |
| 3,967,903 | 7/1976 | Enami et al. | 356/106 R |

*Primary Examiner*—Felix D. Gruber
*Attorney, Agent, or Firm*—Milton Zucker

[57] ABSTRACT

An apparatus and method are herein disclosed for measuring interference patterns and interferograms using a standard monochrome closed-circuit television camera. The invention comprises, in one embodiment, means for processing the video output signal of the CCTV camera to obtain the two-dimensional coordinates for an array of points located on the centers of the interference fringes in one TV frame. The fringe centers are determined from the first and second derivatives of the video output signal of the CCTV camera. The coordinates are then ordered based on their average values in one direction, and the ordered coordinates are then processed in a computer to provide the desired least-squares reduction of the fringe pattern.

3 Claims, 7 Drawing Figures

APPARATUS AND METHOD FOR MEASURING INTERFERENCE PATTERNS AND INTERFEROGRAMS

BACKGROUND OF THE INVENTION

1. Field of the Invention

The present invention relates to an apparatus and method for measuring interference fringe patterns commonly encountered in optical metrology. More particularly, the invention relates to apparatus for use in conjunction with a standard monochrome closed-circuit television system for the purpose of measuring either an interference pattern produced by an interferometer or a photograph of an interference pattern, i.e., an interferogram.

2. The Prior Art

Interferometric testing has long been used in optical metrology. The advent of the laser has not only made interferometers more convenient to use but has also extended their range of application. Interferometry is used as a tool in the fabrication, final testing, and system alignment, see, for example, C. Zanoni, "Interferometry," *The Optical Industry and Systems Directory Encyclopedia,* v. 2, pp. E137-E141 (1977).

For most interferometric measurements, the information is contained in either an interference fringe pattern or an interferogram. The quantitative usefulness of an interference pattern is dependent upon having a method of data extraction and reduction. For a preliminary evaluation, positional deviations of the fringes can be obtained using any of a number of simple manual techniques, see, for example, R. Berggren, "Analysis of Interferograms," *Optical Spectra,* pp. 22-25 (December 1970). An improved manual means for quantifying the irregularities in fringe patterns is disclosed in a copending application of R. L. Gecewicz and G. C. Hunter, Ser. No. 768,342, filed Feb. 14, 1977 which is also assigned to the assignee of this application. From these measurements, the required surface deviations can be calculated. This is adequate for the preliminary correction or evaluation of optical elements if the required accuracy is $\lambda/10$ to $\lambda/20$, and if $\lambda$ is in the visible or infra-red part of the spectrum.

An increasing number of optical elements require correction and evaluation to accuracies of $\lambda/100$ to $\lambda/200$. For these cases, hand measurement is very time-consuming and frequently inaccurate. In order to carry out evaluations and corrections to $\lambda/100-\lambda/200$, or to objectively certify optics to $\lambda/10$ or better, an interferogram measuring system with correspondingly better accuracy is required. In order to extract the information from the interferogram, it is necessary to measure the two-dimensional coordinates for an array of points located on the center of the fringes.

The measurement of fringe centers on interferograms has been carried out using a variety of techniques. Most of the techniques use mechanical scanning to produce the photoelectric signals whose equality is the signature for the location of a fringe center, see, for example, G. D. Dew, "A Method for the Precise Evaluation of Interferograms," J. Sci. Instr. 41, pp. 160-162 (1964) and J. Dyson, "The Rapid Measurement of Photographic Records of Interference Fringes," Appl. Opt. 2, pp. 487-489 (1963). Fringe scanning techniques are capable of measuring fringe displacements of less than 0.01 fringe.

Another approach is to locate the center of the optical density curve by using a computer-generated fit to the output of a microdensitometer trace across a fringe, see, for example, R. A. Jones and P. L. Kadakia, "An Automated Interferogram Technique," Appl. Opt. 7, pp. 1477-1482 (1968). A microdensitometer is capable of measuring fringe displacement somewhat more accurately than 0.01 fringe.

Another technique used in an instrument manufactured by the assignee of this application is based upon using an oscillating spot of light to measure optical density gradients on an interferogram. The signature for sensing the location of an interference fringe center is the null in the first derivative of the optical density. Using an oscillating spot of light and synchronous demodulation leads to a considerably simpler instrument which achieves improved precision in the location of fringe centers with a minimum of equipment. However, this technique is extremely slow and, therefore, lends itself only to the measurement of interferograms. Furthermore, it is costly and difficult to automate this approach.

In order to measure interferometer interference patterns without introducing errors and complexity, it is desirable to extract all of the fringe center data very rapidly, i.e., in a small fraction, 1/30-1/60, of a second, because of the fluctuations induced in the pattern by mechanical vibrations and atmospheric effects.

An improved means for sensing fringe centers rapidly is disclosed in my copending application, Ser. No. 788,736, filed Apr. 19, 1977.

Sophisticated, expensive interferometers have been designed and built for the high precision, automatic reduction of interference patterns. One such instrument is disclosed in Gallagher, et al. U.S. Pat. No. 3,694,088, issued Sept. 26, 1972. Another sophisticated digital interferometer is discussed in J. H. Bruning, et al., "Digital Wavefront Measuring Interferometer for Testing Optical Surfaces and Lenses," Appl. Opt. 13, pp. 2693-2703 (1974).

In many industrial applications, it is desirable to reduce interferograms quickly in a simple, economic manner. For example, in the manufacture of high precision, high volume optical components, interferograms, and interferometer interference patterns must be measured in large numbers and at high speed with affordable instrumentation. The aforementioned prior art apparatus and techniques are capable of high precision, but they have the disadvantages of being quite expensive and of being too slow for volume production. Therefore, their utility is restricted to rather limited, specialized situations.

OBJECT OF THE INVENTION

It is the principal object of this invention to provide an improved apparatus and method for measuring interference patterns and interferograms rapidly, inexpensively, and with an accuracy of the order of 0.02 fringe or better.

STATEMENT OF THE INVENTION

In accordance with the instant invention, I measure interference fringe patterns or interferograms by providing means for processing the video output of a CCTV camera including means to count the number of fringes on the pattern in one TV frame, means to track one fringe per TV frame to establish measurement windows along each fringe, means to measure the two-dimensional coordinates for an array of points located on all of the fringe centers falling within the measurement windows within a single TV frame, including means for determining said coordinates from the first and second derivatives of the video output signal of the CCTV camera, means for ordering the fringes based on the average value of their coordinates—in one direction, preferably the X coordinate, and means for processing the ordered coordinates to provide a least-squares reduction of the fringe pattern.

DETAILED DESCRIPTION OF THE INVENTION

Figure 1:
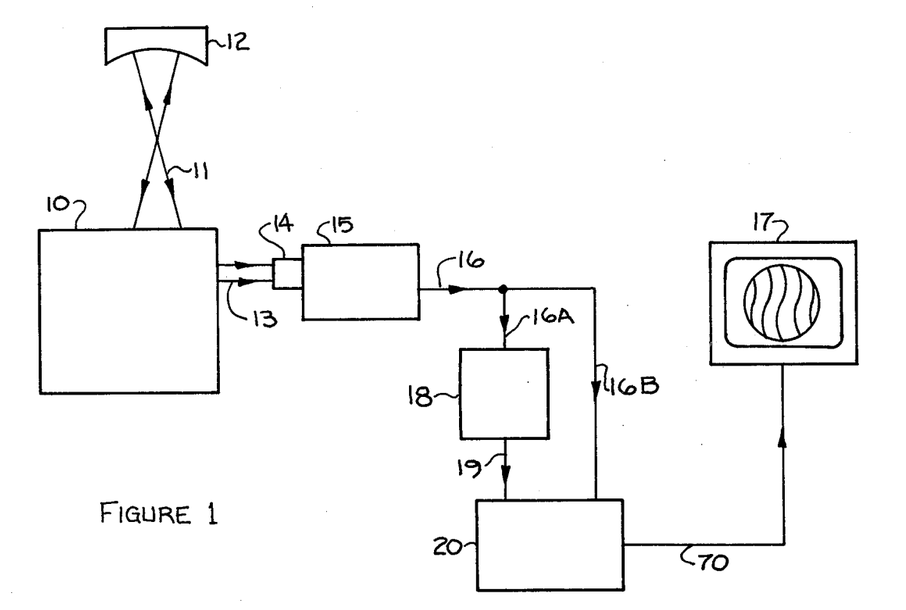
FIG. 1 is a pictorial view illustrating an embodiment of the invention used to measure and reduce the interference pattern from an interferometer.

Description and explanation of FIG. 1

The principal components of one embodiment of the invention are illustrated in FIG. 1. In FIG. 1 the measurement beam (11) of the interferometer (10) impinges on the article under test (12). The output of the interferometer (10) is a beam of light (13) which provides the interference fringe pattern. This interference fringe pattern contains information about the test parameters as well as the article under test. The interference pattern on light beam (13) can be processed in a variety of ways. For example, it can be viewed by inserting a ground-glass screen into the beam (13). If a permanent record of the interference pattern is desired, a photograph can be made of the light beam (13). Alternatively the light beam (13) can be imaged by a lens (14) onto the photosensitive surface of a closed circuit television camera (15) whose video output can be connected with coaxial cable to a closed circuit video monitor (17) either directly or indirectly, as in FIG. 1, through some apparatus which (1) processes the video signal, (2) passes the input video signal to the monitor, and (3) superposes additional information on the input video signal. In this way, the interference fringe pattern appears on the screen of the video monitor (17). The closed circuit television camera and the video monitor can be any of the standard commercially available monochrome models in general use. The only technical requirement is a tolerance on the permissible geometrical distortion in the lens (14) and the camera (15) based on the system accuracy desired.

In the present invention, an interference pattern is scanned by the vidicon in the CCTV camera (15). The fringes in the interference pattern are oriented so that they are nominally perpendicular to the scan lines. The video output (16) of the CCTV camera is fed via two lines (16A) and (16B) to the interface unit (18) and the digital processor (20) respectively. The interface unit (18) contains electronic circuitry to sense the fringe centers from which the two dimensional coordinates of the fringe centers are generated. Line (16B) and the output (19) of the interface unit (18) go to a digital processor (20) which can be any of a variety of commercially available mini or micro computers with a suitable amount of memory. Desirably the output (70) of the digital processor (20) is also fed into the video monitor (17) to display the results of the reduction. For example, either the peak-to-valley, root-mean-square (rms), or both can be displayed on the monitor. In addition, a pattern representing the least squares fit to the fringe pattern can be superposed on the fringe pattern displayed on the monitor; a permanent record can then be made by photographing the monitor.

Figure 5:
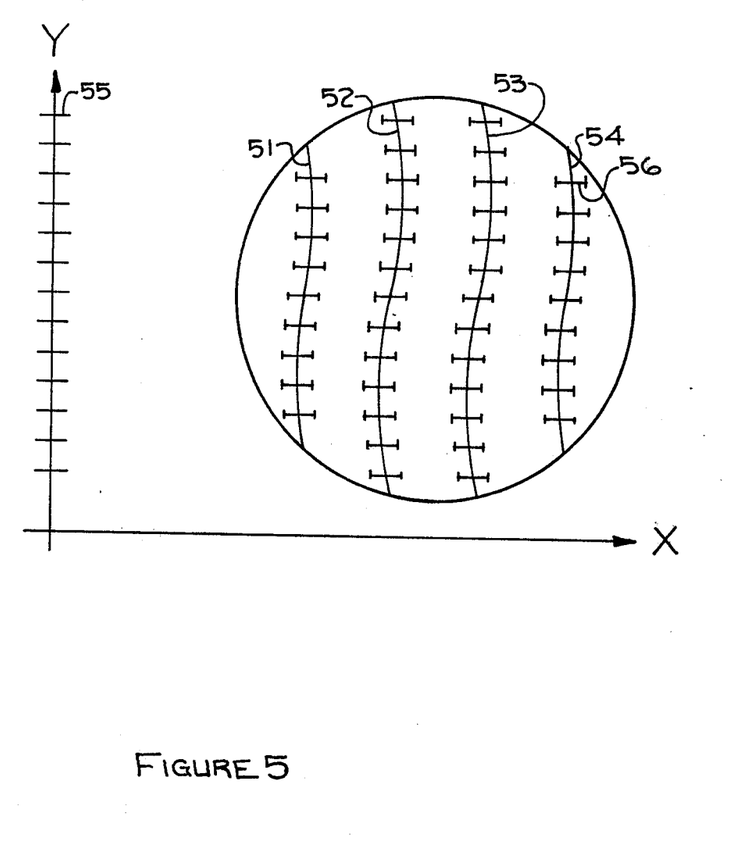
FIG. 5 is a pictorial sketch illustrating the means by which the data are extracted from a fringe pattern.
Figure 6:
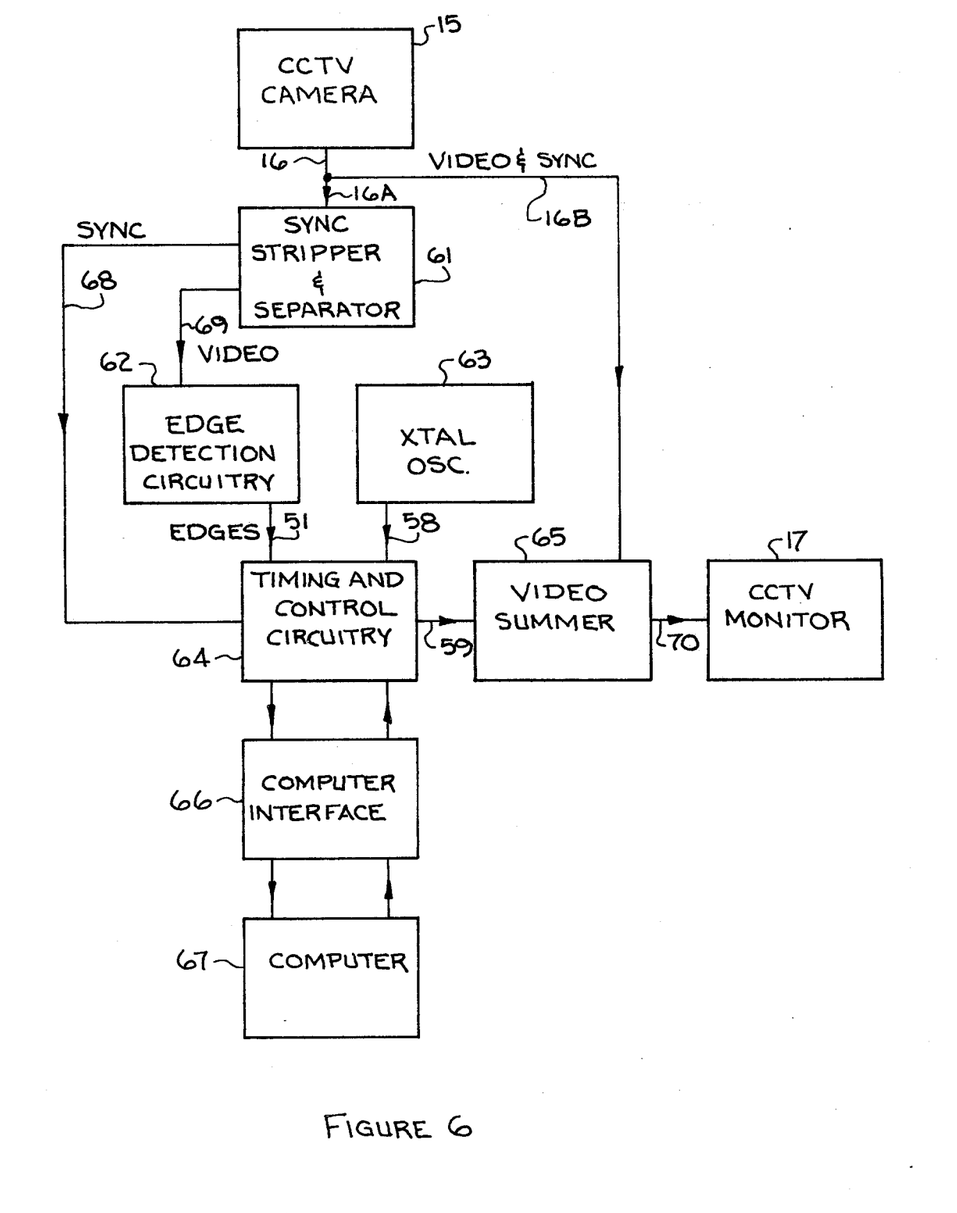
FIG. 6 is a schematic block diagram of the circuitry used in one embodiment of the invention.
Figure 7:
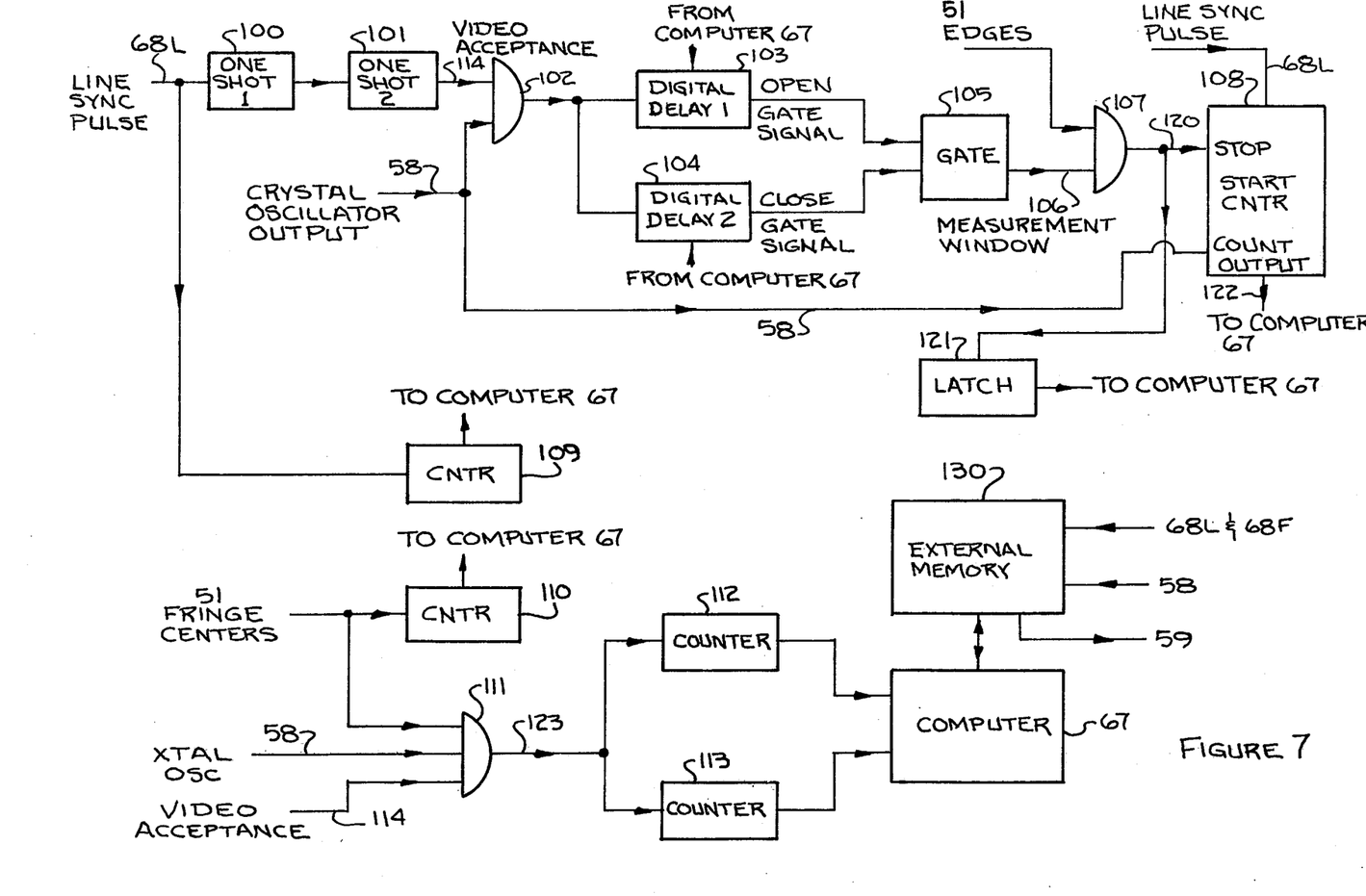
FIG. 7 is a schematic block diagram of the timing and control circuitry.

Details of the interface unit (18) and the processor (20) are shown in FIGS. 5, 6, and 7.

Figure 2:
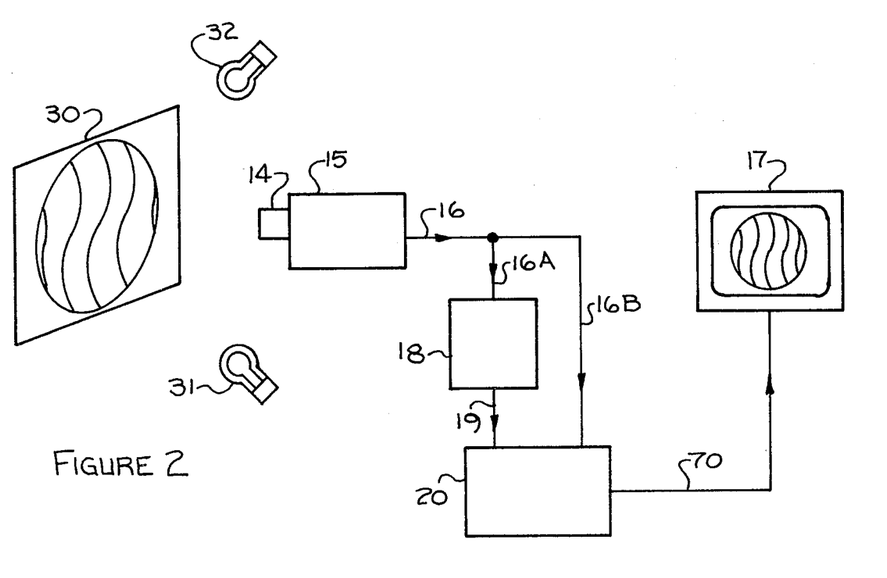
FIG. 2 is a pictorial view illustrating an embodiment of the invention used to measure and reduce an interferogram.

Description and explanation of FIG. 2

FIG. 2 illustrates use of the present invention with a photograph of an interference pattern. The interferogram (30) is a photograph of an interference fringe pattern. Light sources (31) and (32) provide radiant energy to illuminate the interferogram (30). Lens (14) images (30) onto the photosensitive surface of camera (15). The remainder of the apparatus functions in accordance with the description provided for FIG. 1.

Figure 3:
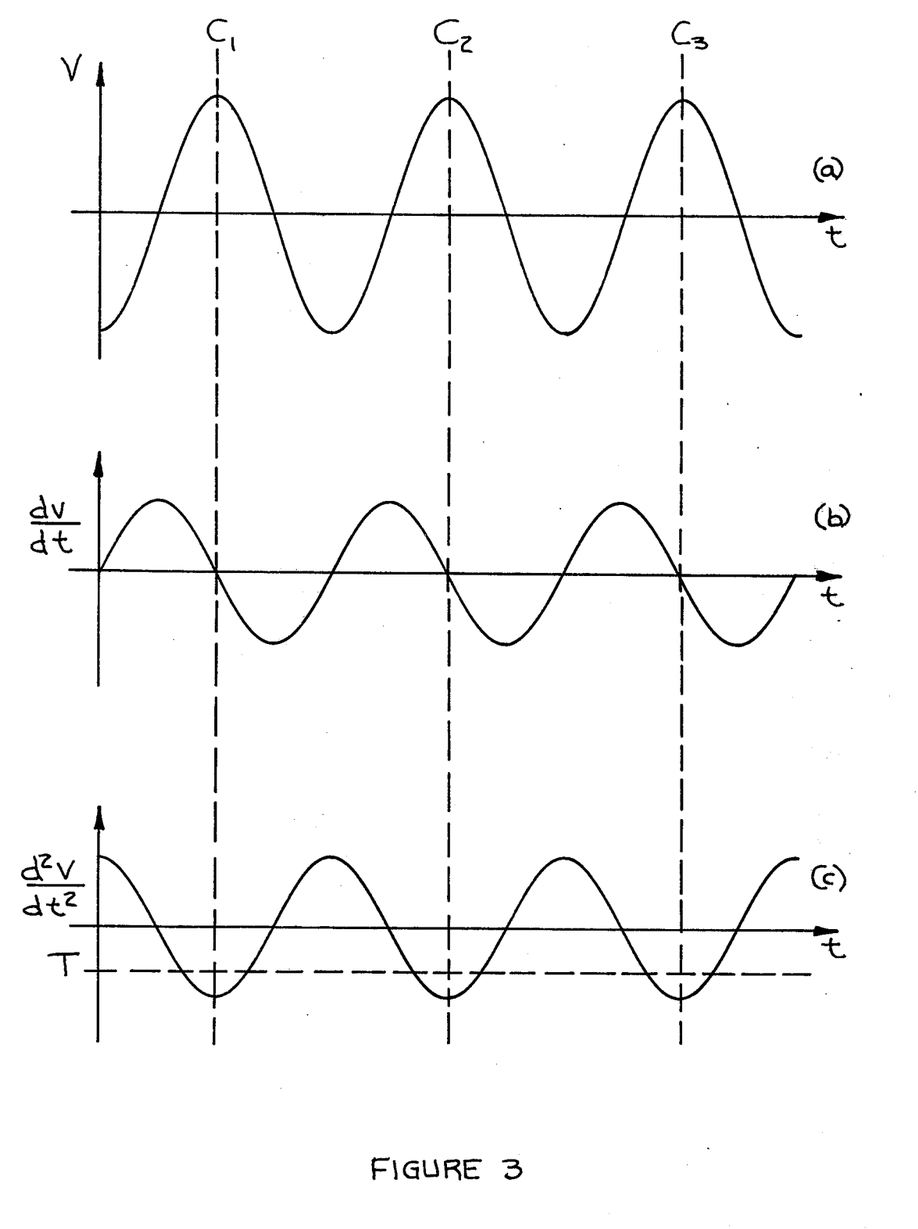
FIG. 3(a) shows a typical CCTV camera video output signal for a single video line across an ideal interference pattern.
FIG. 3(b) shows the first derivative of the signal in 3(a).
FIG. 3(c) shows the second derivative of the signal in 3(a).
Figure 4:
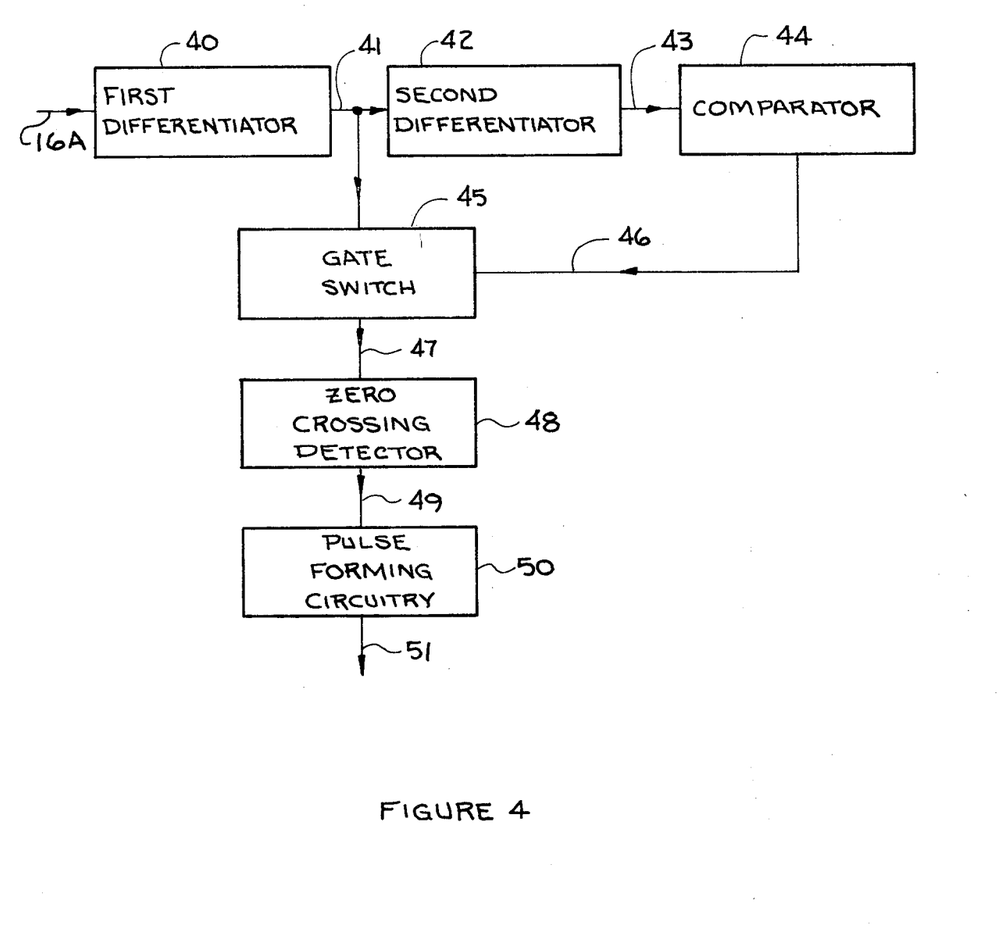
FIG. 4 is a schematic block diagram of the circuitry used to define precisely the point at which the scan passes over a fringe center.

Description and explanation of FIGS. 3 and 4

Referring to FIG. 3, the output (16) of the CCTV camera (15) for a single scan line yields a signal similar to that shown in FIG. 3(a). In FIG. 3(a), the ordinate labeled V is the voltage level of signal (16), and the abscissa t corresponds to time. For an ideal system and uniformly spaced fringes, the curve in 3(a) is represented by $V = 0.5 - \cos^2 \omega t$, where $\omega = 2\pi v/d$, v is the scan speed, and d is the distance between two fringes. The maxima and minima in the 3(a) curve correspond to the constructive (bright) and destructive (dark) interference fringes, respectively. $C_1$, $C_2$, and $C_3$ ($C_n$ collectively) are the centers of three bright fringes. It is necessary to determine the points $C_1$, $C_2$, and $C_3$ with high precision and at high speed if good accuracy and resolution are to be obtained.

I determine the points $C_n$ of the bright fringes precisely and rapidly by means of the techniques illustrated in FIGS. 3 and 4. If the photosensor output (16A), curve 3(a), is differentiated to produce dV/dt, we get curve 3(b). This differentiation can be done with conventional circuitry. The signal in curve 3(b) crosses zero at the points $C_n$ on curve 3(a) since the rate of change of V(t) is zero at $C_n$. A further differentiation to produce the second derivative $d^2V/dt^2$ of the signal (16A) yields the curve shown in FIG. 3(c). Here the second derivative is negative and a minimum at the $C_n$ points.

By using the outputs of the first and second electronic differentiators, I am able to pinpoint precisely and rapidly the centers of the bright fringes as shown in FIG. 4.

The CCTV camera output signal (16A), curve 3(a), passes into a first differentiator (40) to produce a first derivative signal (41), curve 3(b). This first derivative signal (41) is then supplied to two other circuits: (1) to a second differentiator (42) to produce a second derivative signal (43), curve 3(c), and (2) to a gate switch (45). The output (43) of the second differentiator (42) is supplied to the comparator circuit (44). The gate switch (45) is designed so that the first derivative signal (41) passes through as signal (47) only when the comparator (44) provides an output signal indicating that the second derivative signal (43) is negative and below a preset threshold, i.e., the threshold T in curve 3(c). The signal (47) passes into a zero-crossing detector (48). The output (49) of the zero-crossing detector (48) passes into pulse-forming circuitry (50) to produce a pulse (51), whose leading or trailing edge is the signature indicating precisely when the scan passes over a center of a bright fringe.

The explanation above shows how to sense the centers of the bright fringes, i.e., the maxima. Obviously, the technique can be used to sense the centers of dark fringes, i.e., the minima, simply by requiring that the second derivative be positive and have a magnitude above a preset threshold.

The use of the second derivative permits the apparatus to distinguish between the centers of bright and dark fringes. Since these centers all correspond to a zero in the first derivative, they are distinguished in that the corresponding points in the second derivative are near minimum and maximum respectively. In addition, the apparatus can be used when the maxima or minima in the original power output are not sharp, e.g. flat. Flat maxima (or flat minima) can result from improper exposure or reciprocity failure in the film, or both. When a flat maximum occurs, it is obvious that the first derivative curve 3(b) will be zero since no change is then occurring in curve 3(a); similarly, the second derivative curve 3(c) will be near zero, so the apparatus will not deliver a signal. It is only necessary, then, to switch the apparatus to measure the dark fringes. This is done by altering the logic of comparator (44) so that it provides an output signal indicating that the second derivative curve be positive and have a magnitude above a preset value. The circuitry for such a comparator is well known to one skilled in the art of electronics.

The circuitry shown in FIG. 4 is inserted into the system, as described in FIG. 6, as edge detection circuitry (62).

Description and explanation of FIG. 5

FIG. 5 is a pictorial sketch illustrating the means by which the data are extracted from a fringe pattern.

In FIG. 5, the fringes, (51), (52), (53), and (54) are oriented so that they are nominally perpendicular to the scan lines of the CCTV camera. Although only 4 fringes are illustrated, the number of fringes in a TV frame is generally 10 to 15; the maximum is about 25. The uniformly spaced lines (55) marked on the ordinate are referred to as measurement lines. These illustrate the lines along which fringe center coordinates will be obtained. Although only 11 measurement lines are illustrated, there are typically about 25 measurement lines. There can be more or less depending on the application.

Because of fluctuations induced in the fringe patterns by mechanical vibration and atmospheric turbulence effects, it is desirable to extract all of the fringe center data very rapidly, i.e., in a small fraction, 1/30–1/60 of a second. In addition, the basic timing of a CCTV system imposes rather severe constraints on any effort to extract all the data in one TV frame, i.e., 1/30 sec. This point is illustrated by the following numerical example. It takes about 50 microseconds for a TV scan line to traverse the frame. If there are the maximum of 25 fringes per frame, then there is nominally a 2 microsecond time interval between two fringes. If it is desired to measure a fringe to $\lambda/50$, then either a time resolution of 0.08 microseconds or a 12 MHz bandwidth is required.

The coordinates of fringe centers can be extracted (1) by sensing fringe centers using the technique described in FIGS. 3 and 4, (2) by using a stable oscillator with a frequency of at least 12 MHz, and (3) by knowing in which TV scan line the scan is taking place. The detailed means by which this is done will now be set forth.

Step 1: On the initial TV frame, the number of fringes along the center measurement line is counted using the fringe center sensing previously described and a counter.

Step 2: Using each TV scan line, one fringe per frame is tracked along the complete length of the fringe to establish measurement windows e.g. (56) in FIG. 5, along each fringe. The time to carry out this step is $\approx$ the number of fringes $\times 1/30$ sec. plus some processing time. For 25 fringes, $25 \times 1/30 \approx 0.8$ sec.

Step 3: In one frame, measure the coordinates of all fringe centers falling in the measurement windows. Data can be taken in 10–30 consecutive frames to provide averaging.

Step 4: Order the fringes based on the average value of their X coordinates and assign indices to the measurement windows and the fringes. This ordering places the fringes in a sequence based on their average X value so that the next step can be carried out.

Step 5: Process the averaged and ordered fringe center coordinate data to obtain a least-squares reduction using the digital processor (20).

Step 6: Display the output of the processor (20) on the video monitor (17). Alternately, a separate display can be provided for the data. However, by displaying it on the monitor, a permanent photographic record of both the fringe pattern and the reduction can be produced for the record.

It should be noted that the lines (55) and (56) in FIG. 5 are not necessarily seen on the TV screen; they occur only in the timing diagram of the electronics in the apparatus.

Description and explanation of FIG. 6

FIG. 6 is a schematic block diagram of the circuitry used in one embodiment of the invention.

In FIG. 6, the output (16A) of the CCTV camera (15) goes into the sync stripper and separator (61) which is needed if output (16A) is composite video. The sync stripper and separator (61) can be any of a variety of commercially available units. Furthermore, the video and sync signals may be separated in the CCTV camera for some commercial cameras, thereby obviating the need for a separate device. The separated sync signal (68) goes to the timing and control circuit (64) and the video signal (69) goes to the edge detection circuitry (62) (described in detail in FIG. 4). The output (51) of the edge detection circuitry (62) is fed to the timing and control circuitry (64) along with the output (58) of a crystal oscillator (63) to determine the coordinates of the fringe centers. The computer (67) controls the timing and control circuitry. The video summer (65) is used to display alpha numeric information on the monitor by superimposing output (59) on the video signal (16). The output (70) of the video summer (65) is then fed to a CCTV monitor (17). Elements (61) and (62) of FIG. 6 comprise the box (18) of FIGS. 1 and 2; elements (63), (64), (65), and (67) comprise box (20) of the same figures.

Description and explanation of FIG. 7

FIG. 7 is a schematic block diagram of the timing and control circuitry (64) of FIG. 6.

FIG. 7 provides a more detailed description of the timing and control circuitry (64).

The sync output (68) of the sync stripper (61) has two components. One component (68F) contains a pulse at the beginning of each frame, and the other component (68L) contains a pulse at the beginning of each line. Since the video output (16) of the CCTV camera contains both video information and synchronization information, a video acceptance pulse (114) is generated by taking the line synchronization pulse (68L) and putting it into the two one-shots (100) and (101). The delay of one-shot (100) is set so that the end of the delay is coincident with the start of the video information. When one-shot (100) turns-off, it triggers one-shot (101) whose width is equal to the width of the video information. Thus one-shot (101) is on during the video portion of the output (16) of the CCTV camera (15). Its output is then called the video acceptance pulse (114). The video acceptance pulse (114) is logically "ANDED" with the output (58) of the crystal oscillator (63) and sent to two digital delays (103) and (104) whose delays are set by the computer (67). The output of digital delay (103) is used to open a gate (105) and the output of digital delay (104) is used to close gate (105). Thus by properly setting the two delays a measurement window (106) can be opened up at any point during the video acceptance pulse (114).

The location of the measurement windows around the fringe centers is obtained as follows. The measurement window pulse (106) is "ANDED" in AND gate (107) with the output (51) of edge detection circuitry (62). The output of the AND gate (107) is used to stop a counter (108). The counter (108) counts the number of pulses of the crystal oscillator (63) which occur from the start of the TV line to the occurrence of the first fringe center. The other fringe centers are obtained by moving the measuring window to the right of the first fringe center until another fringe center is found. This is repeated for all the fringe centers to the right side of the picture. The same procedure is then repeated on the left side of the fringe. The fringe centers on one fringe are tracked vertically by setting the measurement window on the center of the first point found, and then moving the measurement window down along the screen, and remembering where the center falls on the next TV line. The position of the measurement window is now updated and moved down again. This is repeated for all fringes. The counter (108) is started at the beginning of the TV line by the line synchronization pulse (68L). The output (120) of AND gate (107) is also used to set a latch (121) to inform the computer (67) that a fringe center has occurred during the measurement window (106). Thus the output (122) of the counter (108) corresponds to the X coordinate of the fringe center. The Y coordinate of the fringe center is obtained from counter (109) which counts the number of line synchronization pulses (68L) which have occurred from the beginning of the frame. Another counter (110) is used to count the number of fringe centers on each TV line. Therefore by properly setting the digital delays (103) and (104), one can track and set up the measurement windows on the centers of each fringe in one TV frame. Setting up all the measurement windows in the above manner takes place over as many frames as there are fringes.

To find the fringe coordinates of all the fringes in one frame, the edges or fringe centers are "ANDED" with the crystal oscillator output (58) and the video acceptance pulse (114) in AND gate (111). Its output (123) is then sent to two parallel counters (112) and (113). Counter (112) first counts the location of fringe 1, and then turns on counter (113) which finds the distance from fringe 1 to fringe 2. While counter (113) is counting, the output of counter (112) is loaded into the internal memory of computer (67). When counter (113) has finished counting, it turns on counter (112) which now yields the distance between fringe 2 to fringe 3, and so on. This information along with the output of counter (109) enables one to obtain all the fringe centers in one frame.

Once all the fringe centers in a single frame are available to the computer, the computer software orders the fringe centers based on the average value of their coordinates in one direction—preferably and most easily the X direction, and then performs the numerical computations on the ordered coordinates to provide the desired least squares reduction, which can yield either the peak-to-valley or root-mean-square errors in the fringe pattern.

While a preferred embodiment of the invention has been disclosed, obviously modification can be made therein, without departing from the scope of the invention as defined in the following claims.

What I claim is:

1. An apparatus for measuring an interference fringe pattern rapidly and accurately comprising means for putting said fringe pattern into a CCTV system including a camera and a monitor, means for displaying said fringe pattern on said monitor, means for processing the video output of said camera including means to count the number of fringes on the pattern in one TV frame, means to track at least one fringe per TV frame to establish measurement windows along said fringe, means to sense the fringe centers from the first and second derivative of the video output of said camera, means including an oscillator to measure the two dimensional coordinates for an array of points located on all of the fringe centers falling within said measurement windows within a single TV frame, and also including means for ordering said coordinates of said fringe centers based on their average value in one direction and for processing the ordered coordinates to provide a least-squares reduction of said fringe pattern.

2. The apparatus of claim 1, in which a stable crystal oscillator with a frequency of at least 12 MHz is used to provide timing which permits the extraction of the desired data within a single TV frame.

3. The apparatus of claim 1, in which said means sense said fringe centers comprises means for obtaining the first derivative of the output of said camera, which output is zero at the points at which the bright fringes are at maxima and the dark fringes are at minima, means for further differentiating the output to obtain the second derivative thereof, and means for producing signals indicating the centers of the bright fringes only when said first derivative is zero and the second derivative is below a preset threshold set near the magnitude of the minima, and of the dark fringes only when said first derivative is zero and said second derivative is above a preset threshold set near the magnitude of the maxima.

* * * * *